United States Patent
Lavy et al.

(10) Patent No.: US 7,650,748 B2
(45) Date of Patent: Jan. 26, 2010

(54) PARTICLE FILTER REGENERATION METHOD WITH CATALYTIC COMBUSTION DEVICE AND FILTRATION INSTALLATION USING SUCH A METHOD

(75) Inventors: Jacques Lavy, Serpaize (FR); Jean-Baptiste Dementhon, Paris (FR); Daniel Blancotto, Saint-Maurice (FR); Turkay Erol, La Varene Saint-Hilaire (FR)

(73) Assignees: Institut Francais du Petrole, Rueil-Malmaison Cedex (FR); Airmees, Vigneux sur Seine (FR)

( * ) Notice: Subject to any disclaimer, the term of this patent is extended or adjusted under 35 U.S.C. 154(b) by 67 days.

(21) Appl. No.: 11/300,393

(22) Filed: Dec. 15, 2005
(Under 37 CFR 1.47)

(65) Prior Publication Data

US 2007/0294997 A1    Dec. 27, 2007

(30) Foreign Application Priority Data

Dec. 20, 2004    (FR) .................................. 04 13622

(51) Int. Cl.
*F01N 3/00*    (2006.01)
(52) U.S. Cl. .............................. 60/295; 60/274; 60/286; 60/292; 60/303; 60/311; 55/DIG. 30
(58) Field of Classification Search .................. 60/297, 60/311, 274, 286, 289, 292, 295, 301, 303; 55/DIG. 30
See application file for complete search history.

(56) References Cited

U.S. PATENT DOCUMENTS

| | | | | |
|---|---|---|---|---|
| 4,322,387 A * | 3/1982 | Virk et al. ................... 422/174 |
| 4,485,621 A | 12/1984 | Wong et al. |
| 5,634,331 A * | 6/1997 | Aoki et al. ..................... 60/284 |
| 5,711,149 A * | 1/1998 | Araki ........................... 60/278 |
| 5,746,989 A * | 5/1998 | Murachi et al. ........... 423/213.7 |
| 5,758,496 A * | 6/1998 | Rao et al. ...................... 60/295 |
| 5,771,683 A * | 6/1998 | Webb ........................... 60/274 |
| 6,233,926 B1 | 5/2001 | Bailey et al. |
| 6,622,480 B2 * | 9/2003 | Tashiro et al. ................. 60/295 |
| 6,718,757 B2 * | 4/2004 | Khair et al. .................... 60/286 |
| 6,871,489 B2 * | 3/2005 | Tumati et al. ................. 60/285 |
| 6,952,918 B2 * | 10/2005 | Imai et al. ..................... 60/295 |
| 6,959,542 B2 * | 11/2005 | Taylor et al. .................. 60/295 |
| 7,032,376 B1 * | 4/2006 | Webb et al. ................... 60/297 |
| 2002/0178922 A1 | 12/2002 | Ohno et al. |
| 2003/0140622 A1 | 7/2003 | Taylor, III et al. |

FOREIGN PATENT DOCUMENTS

EP    1 300 554 A2    4/2003

(Continued)

*Primary Examiner*—Binh Q. Tran
(74) *Attorney, Agent, or Firm*—Antonelli, Terry, Stout & Kraus, LLP.

(57) ABSTRACT

The present invention relates to a method for regenerating a particle filter (10) arranged in the exhaust line (12) of an internal-combustion engine, notably of diesel type, wherein the clogging state of the filter is evaluated, this state is compared with a threshold value, then, if this threshold value is exceeded, a fluid and a fuel are mixed together, this mixture is subjected to catalytic combustion to generate the hot gases required for regeneration of the filter and regeneration of the filter is carried out by means of hot gases flowing through said filter and whose temperature is sufficiently high to provide combustion of the particles retained in this filter.

According to the invention, prior to mixing the fluid and the fuel, the temperature of the fluid is raised up to the catalytic combustion light-off temperature.

13 Claims, 3 Drawing Sheets

FOREIGN PATENT DOCUMENTS

| | | |
|---|---|---|
| EP | 1 344 908 A1 | 9/2003 |
| EP | 1 479 883 A1 | 11/2004 |
| FR | 2 753 393 | 3/1998 |
| GB | 2114913 | 9/1983 |
| JP | 59-101522 | 6/1984 |

* cited by examiner

PARTICLE FILTER REGENERATION METHOD WITH CATALYTIC COMBUSTION DEVICE AND FILTRATION INSTALLATION USING SUCH A METHOD

FIELD OF THE INVENTION

The present invention relates to a method for regenerating particle filters, notably those intended for particles present in the exhaust gases of internal-combustion engines, and to an installation using such a method.

It notably concerns the sphere of managing fouling of a filter arranged in the exhaust line of an internal-combustion engine, notably of diesel type, and through which flow exhaust gases carrying particles such as carbon-containing particles or soots.

Such engines generate particularly large amounts of particles and their exhaust lines are more and more often equipped with filters which retain these particles with very high filtration efficiencies close to 100%.

However, such filters have to be periodically regenerated in order to prevent clogging by fouling. In fact, clogging leads to an increase in the back pressure at the exhaust, which has the effect of increasing the fuel consumption of the engine. In the extreme case of total filter clogging, the result can be serious engine dysfunctioning or even complete engine failure, and/or destruction of the filter.

BACKGROUND OF THE INVENTION

Regeneration of a particle filter sometimes occurs naturally when the temperature of the exhaust gases has reached the level required to burn the particles present in this filter.

However, under certain engine running conditions, the exhaust gas temperature is not sufficient to provide regeneration of the filter and it is then necessary to artificially initiate combustion of the particles when fouling of the filter has reached a certain threshold.

It can consist in increasing the temperature of the filter above 550° C., generally by temporarily raising the air/fuel ratio of the exhaust gases flowing therethrough without a ratio 1 being reached, and in obtaining an oxidizing composition of these gases to achieve combustion of the particles retained in this filter.

This involves the major drawback of increasing the fuel consumption.

Another technique consists, as described more in detail in European patent EP-0,341,832, in arranging a catalyst for oxidizing the nitrogen monoxide (NO) upstream from the filter. This catalyst oxidizes the nitrogen monoxide contained in the exhaust gases to nitrogen dioxide ($NO_2$) and this nitrogen dioxide is then used to allow combustion of the particles trapped on the filter at a temperature ranging between 280° C. and 400° C.

This technique requires a diesel fuel with a very low sulfur content (of the order of 50 ppm) to maintain a sufficient conversion efficiency of the oxidation catalyst so as to obtain a large amount of NO converted to $NO_2$.

Other techniques involve a chemical process wherein organometallic additives, such as cerium for example, are added to the diesel fuel so as to obtain combustion of the particles present in the filter at a temperature close to 400° C. to 450° C.

Using such additives is quite costly and requires a particular device for feeding these additives notably into a diesel fuel tank.

It is also well known to heat these exhaust gases by means of additional devices arranged in the exhaust line and upstream from the filter, such as burners or resistors, as described more in detail in patents FR-2,753,393 and FR-2,755,623 filed by the applicant.

In this configuration, it is necessary to provide a high amount of heat energy to the exhaust gases, either by burning a large amount of fuel when using a burner, or by using a high electric power in the case of resistors.

The major drawback thereof is that it significantly increases the fuel consumption of the engine and decreases the driving comfort.

The present invention aims to overcome the aforementioned drawbacks by means of a method and of a device allowing to reach regeneration temperatures very rapidly while minimizing consumption.

SUMMARY OF THE INVENTION

The present invention thus relates to a method for regenerating a particle filter arranged in the exhaust line of an internal-combustion engine, notably of diesel type, a method wherein the clogging state of the filter is evaluated, this state is compared with a threshold value, then, if this threshold value is exceeded, a fluid and a fuel are mixed together, this mixture is subjected to catalytic combustion to generate the hot gases required for regeneration of the filter and regeneration of the filter is carried out by means of hot gases flowing through said filter and whose temperature is sufficiently high to provide combustion of the particles retained in the filter, characterized in that, prior to mixing the fluid and the fuel, the temperature of the fluid is raised up to the catalytic combustion light-off temperature.

Advantageously, the temperature of the fluid can be raised by heating said fluid by means of a heating resistor.

Air and/or the exhaust gases of the engine can be used as the fluid.

The exhaust gases can be circulated around a catalytic element used for catalytic combustion in order to raise the temperature of said element.

An additive can be added to the fuel to lower the combustion temperature of the particles.

The invention also relates to a installation for filtering exhaust gases from an internal-combustion engine, notably of diesel type, with a filtration unit comprising at least one filtration zone including a filter cartridge through which the exhaust gases of the engine flow, and a catalytic combustion device allowing to generate hot gases required for regeneration of at least one of said cartridges, characterized in that it comprises an element for preheating the fluid flowing through the catalytic combustion device.

The catalytic combustion device can comprise a line connected to the filtration unit and carrying a catalytic element and a fuel injection device.

Preferably, the preheating element can comprise a resistor.

The catalytic combustion device can comprise a means for pumping the fluid intended to flow through the catalytic element.

The filtration installation can comprise a distribution compartment arranged upstream from the cartridge and carrying an inlet for the exhaust gases from the engine and an intake for the hot gases coming from the catalytic combustion device.

The distribution compartment can comprise a valve shutoff means for controlling the inflow of exhaust gases from the engine and the intake of hot gases.

The filtration installation can comprise a line for heating the catalytic element.

The catalytic element can comprise a catalyst element for catalytic combustion and catalytic element for oxidation of the exhaust gases.

The catalytic element can be impregnated with a catalytic formulation allowing to educe the nitrogen oxides content of the exhaust gases.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
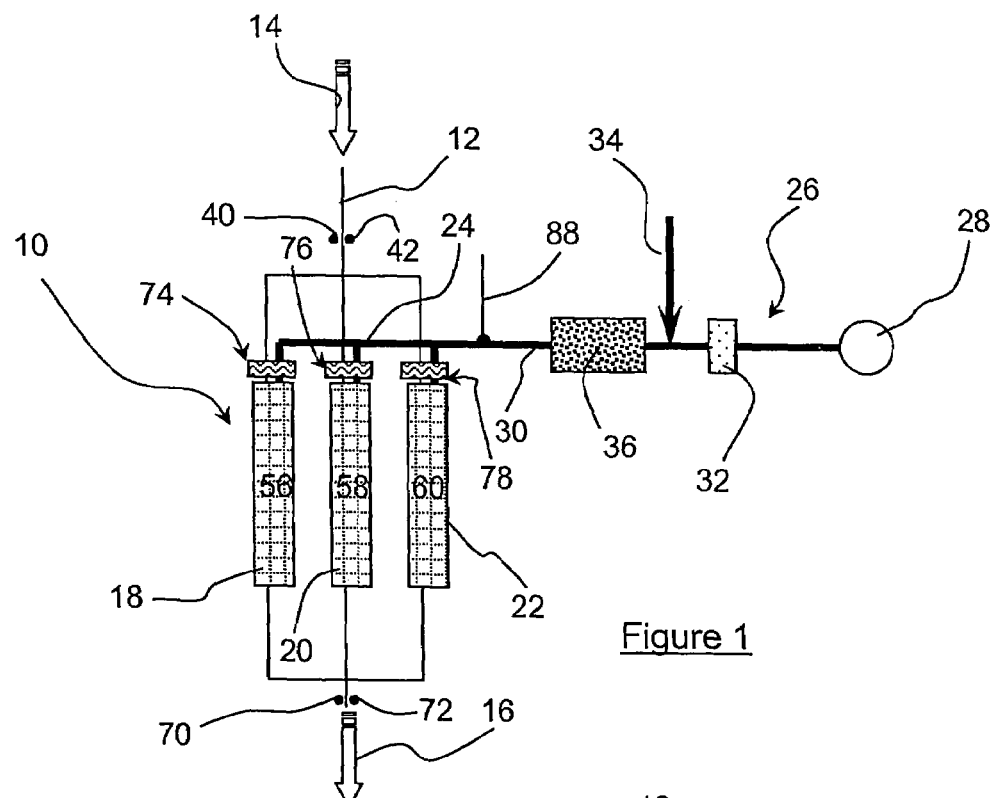
FIG. 1 is a diagram showing the particle filter regeneration installation according to the invention.

In FIG. 1, the installation comprises a filtration unit 10, notably a particle filter, arranged on an exhaust line 12 of an internal-combustion engine, more particularly a diesel type engine.

The exhaust gases flow through this unit along a path symbolized by arrows 14 (gas inflow) and 16 (gas outflow) in FIG. 1 and divided into at least two filtration zones, here three zones 18, 20, 22, preferably substantially identical. The installation also comprises a catalytic combustion device 26 allowing to generate hot gases sent through a line 24 to this filtration unit.

This catalytic combustion device comprises an outside air delivery pump 28 and, in the direction of circulation of this air along a line 30 connected to connecting line 24, a device 32 for preheating the air circulating in line 30, a device 34 for injecting fuel into the line and a catalytic element 36 referred to as catalyst in the description hereafter.

The preheating device is preferably a resistor arranged within the line, between the pump and fuel injection device 34, powered by a battery or by a supercapacity, and swept by the air circulating therein under the effect of the pump. The fuel injection device can be a pump injection nozzle connected to the fuel circuit this engine is usually equipped with. The catalyst is of oxidation catalyst type for oxidizing the fuel contained in the fuel mixture flowing therethrough and it allows to heat very rapidly the air contained in this mixture, and thus to deliver hot gases to line 24. This catalyst can be in form of a monolith consisting of a corrugated metal strip wound round itself, thus forming a cylindrical assembly called "honeycomb". The size of this cylindrical assembly depends on the volume of the exhaust gases flowing therethrough in order to limit the back pressure. This catalyst can also consist of a cordierite monolith or of a filtering element made of silicon carbide for example, impregnated with an oxidation catalytic formulation.

Figure 2:
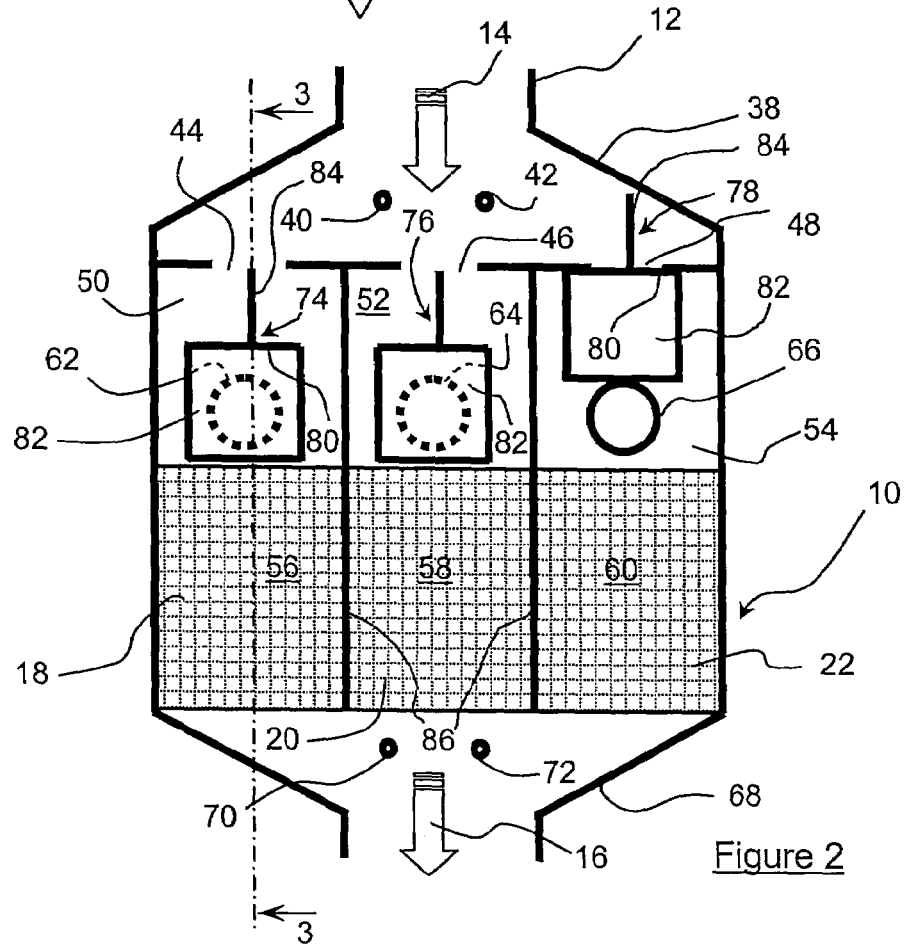
FIG. 2 illustrates an example of embodiment of the filtration unit of the installation of FIG. 1.

In FIG. 2, filtration unit 10 comprises an exhaust gas inlet manifold 38 connected to exhaust line 12 into which the exhaust gases are fed. Several detectors, more precisely a pressure detector 40 (upstream pressure detector) and a temperature detector 42 (upstream temperature detector), are arranged in this manifold. The manifold opens through inlets 44, 46, 48 into filtration zones 18, 20, 22 which comprise each, downstream from these inlets, a distribution compartment 50, 52, 54 provided upstream from a filter cartridge 56, 58, 60 and into which opens, through bypasses of line 24, a hot gas intake 62, 64, 66. The outlets of the cartridges lead to an outlet manifold 68 connected to exhaust line 12 and which also comprises several detectors, such as a pressure detector 70 (downstream pressure detector) and a temperature detector 72 (downstream temperature detector).

Each distribution compartment comprises a valve shutoff means 74, 76, 78 allowing to control the exhaust gas inflow and/or hot gas intake 62, 64, 66.

The valve shutoff means are controlled by one or more actuators (not shown) independently of one another, but without closing simultaneously all the inlets 44, 46, 48 of compartments 50, 52, 54.

By way of example, as illustrated by FIGS. 3 to 7, the valves comprise each two shutoff means linked to one another, a first means, referred to as plate 80, allowing to open or to close the exhaust gas inlet and a second means, referred to as slide 82, allowing to open and to close the hot gas intake. The plate and the slide are arranged in such a way that the exhaust gas inlet and the hot gas intake of a single compartment cannot be closed simultaneously. Preferably, the inlet and the intake are arranged orthogonally in relation to one another so that the plate and the slide are also arranged orthogonally. Motion of these shutoff means is controlled by a rod 84 subjected to a translation displacement under the action of any known means, such as a jack, an electromagnet, . . . .

Furthermore, partitions 86 are provided to isolate zones 18, 20, 22 from one another and to delimit compartments 50, 52, 54.

In the case of the present description, the terms "upstream" and "downstream" refer, for the filtration unit, to the circulation of the exhaust gases from inlet manifold 38 to outlet manifold 68 whereas, in the case of the catalytic combustion device, circulation of the air is considered from pump 28 to intakes 62, 64, 66.

During operation, a control unit (not shown) such as an engine computer the engine is usually equipped with determines the position of valves 74, 76, 78 according to the various engine running parameters.

As illustrated in FIG. 2 by way of example, for average engine loads or for average exhaust gas flow rates (of the order of 200 to 400 m$^3$/h), valves 74 and 76 may be controlled by the control unit so that they open exhaust gas inlets 44 and 46 while closing intakes 62 and 64 through slides 82 whereas valve 78 closes exhaust gas inlet 48 through plate 80. This advantageously allows to adjust the filtration volume to the volume of the gases flowing through the filtration unit.

Figure 3:
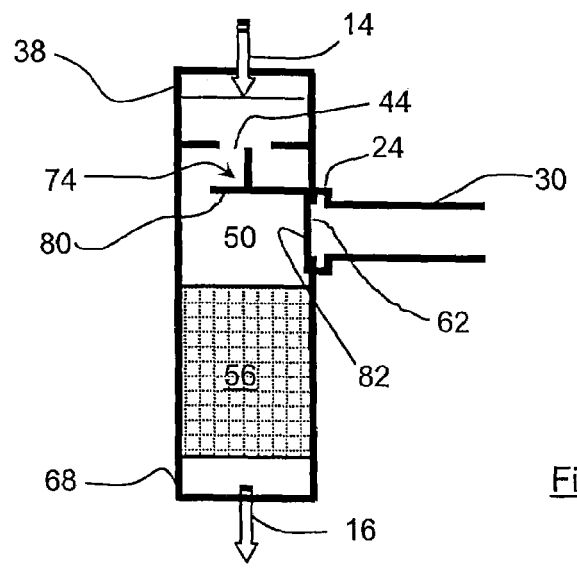
FIG. 3 is a sectional side view along line 3-3 of FIG. 2.

By way of example, the installation is considered to be in the loading state as shown in FIGS. 2 and 3, i.e. cartridges 56, 58, 60 are not saturated with the particles or soots contained in the exhaust gases. In this case, all of the exhaust gases flows, through inlets 44 and 46, from manifold 38 to compartments 50, 52, then through cartridges 56 and 58 so that the major part of the particles contained in these gases is retained by these cartridges and eventually reaches outlet manifold 68 to be discharged through exhaust line 12. In this configuration, resistor 32 is not supplied with fuel, no fuel is fed into line 30 through injection nozzle 34 and catalyst 36 is at ambient temperature.

Periodically, generally every 200 km or every two working hours, a period that may be modified according to the conditions of use, an estimation of the clogging degree of the filtration unit is performed. More particularly, clogging by the particles of each cartridge 56, 58, 60 is examined.

Therefore, starting from the configuration of FIG. 2, the control unit controls the valves in such a way that a single exhaust gas inlet is open. Thus, from the example shown in FIG. 2, valve 76 is actuated to close exhaust gas inlet 46 and only inlet 44 is open. All of the exhaust gases thus flows through this inlet 44, then circulates in cartridge 56 and flows out into line 12 through outlet manifold 68. By means of upstream and downstream pressure detectors 40 and 70 respectively, a pressure drop is calculated by the control unit, then compared with a value table contained in this unit. If the value of this pressure drop is lower than a threshold value of this table, the unit controls the valves in such a way that this clogging degree examination is repeated on next cartridge 58 by opening inlet 46 and by closing inlet 44. Similarly, if the pressure drop of cartridge 58 is lower than the threshold value, the operation is repeated on cartridge 60.

Figure 4:
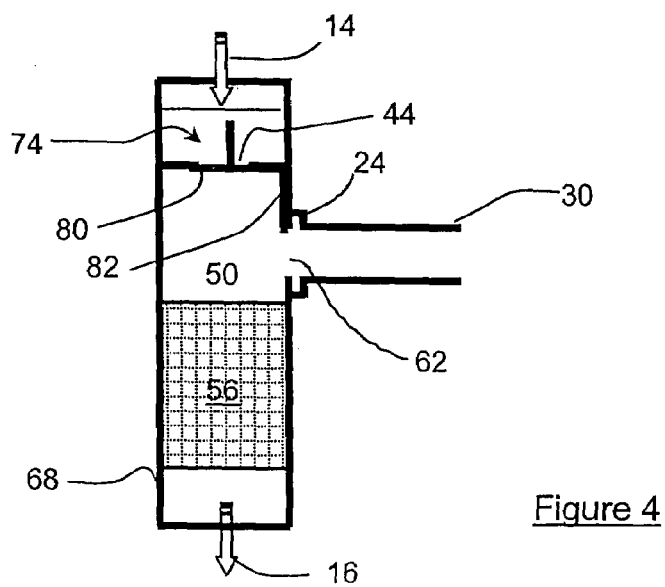
FIG. 4 is a view similar to FIG. 3 showing a regeneration mode.

If the threshold value of the pressure drop of one of the cartridges is reached, for example cartridge 56 as illustrated in FIG. 4, then valve 74 closes exhaust gas inlet 44 by means of plate 80 and releases hot gas intake 62 so as to start regeneration of this cartridge. Of course, the control unit will best adjust the volume of exhaust gas to be treated by the other cartridges by controlling the valves associated therewith so that at least one of inlets 46 and 48 is open.

Simultaneously with the closing of inlet 44, the unit starts pump 28 which circulates air in line 30 and sends an electric current through resistor 32. The resistor thus heats the air in this line so that it reaches a temperature close to 250° C., which is the catalyst light-off temperature. This temperature of the air is constantly monitored by a temperature detector 88 provided in line 30 downstream from catalyst 36. As soon as this temperature is reached, fuel is injected into line 30 and upstream from catalyst 36 through injection nozzle 34. By catalytic reaction, the air/fuel mixture flowing through this catalyst consumes and the hot gases coming from this catalyst reach a temperature above 550° C., which is necessary and sufficient to ensure combustion of the particles present in the cartridge to be regenerated. These hot gases then enter compartment 50 through intake 62, flow through cartridge 56 to burn the particles retained therein and flow out through manifold 68 so as to be discharged into exhaust line 12.

The cartridge regeneration rate is controlled by the control unit which manages the amount of fuel fed into line 30 as well as the flow rate of the air circulating therein by means of pump 28. Similarly, this unit will stop supplying resistor 32 if necessary.

Once regeneration of cartridge 56 is completed, the control unit actuates the valves so that the regeneration installation goes back to the configuration preceding this regeneration, as illustrated in FIG. 2. If necessary, the control unit will control the valves as described above to start regeneration of another cartridge.

Advantageously, an additive may be mixed with the fuel prior to injecting it into line 30 through nozzle 34 in order to lower the reaction temperature of the catalyst.

Figure 5:
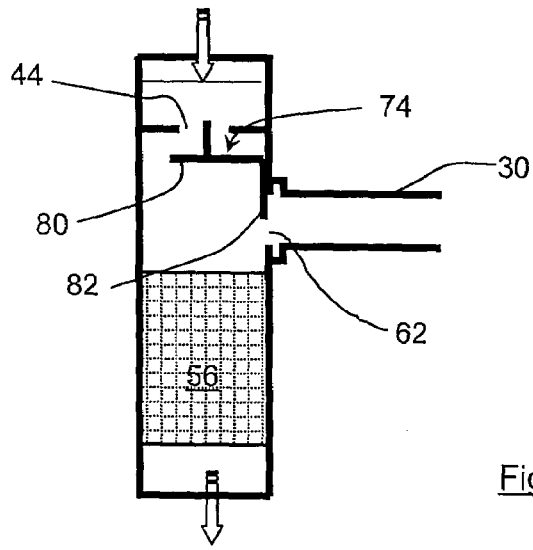
FIG. 5 illustrates a variant of the element of the installation of FIG. 4.

Preferably, as can be seen in FIG. 5, during regeneration of cartridge 56 and depending on the upstream and downstream temperatures detected by detectors 42 and 72 and transmitted to the control unit, this control unit may control valve 74 so as to temporarily open intake 44 by removing plate 80 from its seat while leaving intake 62 open. This has the effect of allowing exhaust gases through this cartridge, thus preventing too great a heat exchange for this cartridge during regeneration thereof.

Figure 6:
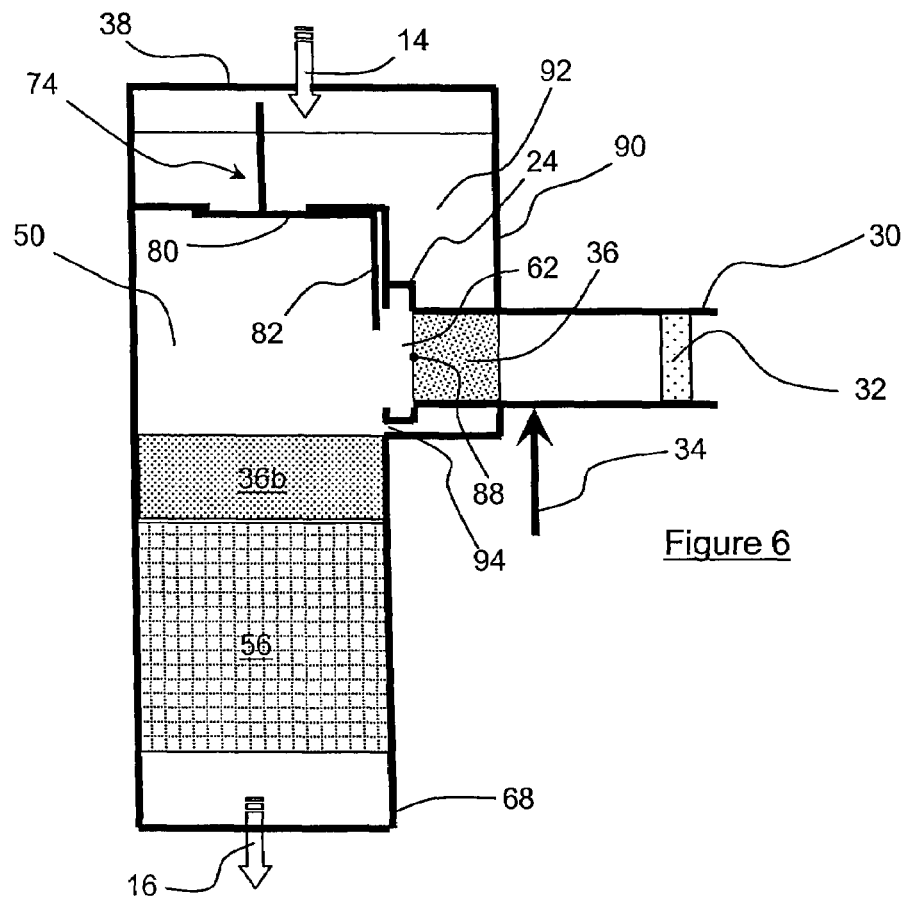
FIG. 6 is a sectional side view of a variant of the example of FIG. 2.

The example shown in FIG. 6 is a variant of FIG. 2 and therefore comprises the same reference numbers for the parts common to the two figures.

In this variant, catalytic combustion device 26 comprises the same elements as those described in connection with FIG. 1 (pump, heating resistor, fuel injection nozzle and catalyst). In this example, catalyst 36 is arranged as close as possible to the cartridges so that the flow of the hot gases between this catalyst and the cartridges is minimized and thus the thermal losses of these gases are limited.

Advantageously, this catalyst may be bathed in the exhaust gases which thus transmit part of their heat energy to this catalyst, which minimizes the electric power supplied to the resistor while decreasing the time required for this catalyst to reach its light-off temperature. More precisely, a line 90 has an inlet 92 which starts at inlet manifold 38 and an outlet 94 which opens into one of the compartments, here compartment 50 and upstream from cartridge 56. Line 30 runs substantially orthogonally across this heating line 90 whose transverse dimension is such that the transverse dimension of line 30 is included therein. The catalyst is arranged in the region of line 30 that runs across heating line 90 so that the exhaust gases coming from manifold 38 surround by sweeping the part of line 30 comprising catalyst 36 and transmit their calories to this catalyst.

Preferably, outlet 94 of line 90 is not closed by slide 82 of valve 74 so that the exhaust gases permanently circulate from the inlet manifold to the compartment by bathing constantly the section of the line carrying the catalyst.

Advantageously, in order to limit the thermal inertia of this catalyst, it may be separated into several elements, a first element instead of catalyst 36 to ensure catalytic combustion of the fuel mixture circulating in line 30 and a second catalytic element 36b arranged upstream from cartridge 56 and downstream from hot gas intake 62, whose function is to oxidize the unburnt hydrocarbons (HC) and the carbon oxides (CO) present in the exhaust gases and/or in the hot gases resulting from catalytic combustion.

Operation of the filtration unit comprising the elements described in connection with FIG. 6 is identical to that described in connection with FIGS. 1 to 5, with the additional advantage that catalyst 36 is at a temperature substantially close to the temperature of the exhaust gases. This allows catalyst 36 to be operational more rapidly by means of heating line 90 and to limit the electric power to be sent to the resistor to heat the air circulating in line 30.

Figure 7:
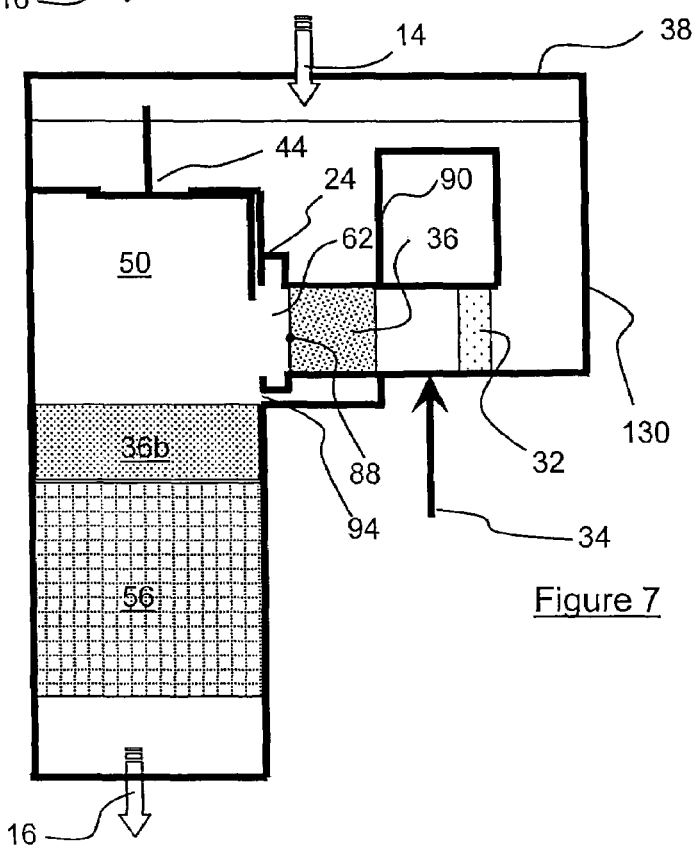
FIG. 7 is a sectional side view of another variant of the example of FIG. 2.

The embodiment illustrated in FIG. 7 is a variant of FIG. 6 and therefore comprises the same reference numbers as this figure.

This variant differs from FIG. 6 in that the catalytic combustion device comprises no air circulation pump.

In this case, line 130 carrying resistor 32, injection nozzle 34 and catalyst 36 starts at inlet manifold 38 and opens onto hot gas intake 62 as described above in connection with FIGS. 1 to 5.

Thus, during the cartridge regeneration operations, resistor 32 is supplied (in cases where the exhaust gas temperature is not sufficient to bring catalyst 36 to its light-off temperature) and heats the exhaust gases that flow therethrough. As soon as this temperature is reached, as measured by detector 88, the injection nozzle feeds fuel into line 130, downstream from the resistor and upstream from the catalyst, and it stops the power supply to the resistor if necessary. The exhaust gases circulating in this line contain enough oxygen for the fuel mixture flowing through catalyst 36 to be oxidized and to provide, at the catalyst outlet, hot gases which are thereafter fed through intake 62 into compartment 50, then flow through cartridge 56.

Of course, the present invention is not limited to the embodiment examples described and encompasses any equivalent and variant.

Notably, either catalyst 36 or cartridges 56, 58, 60 may be impregnated with a catalytic formulation allowing the NOx present in the hot gases or in the exhaust gases to be reduced.

The invention claimed is:

1. A method for regenerating a particle filter arranged in the exhaust line of an internal-combustion engine, notably of diesel type, a method wherein the clogging state of the filter is evaluated, this state is compared with a threshold value, then, if this threshold value is exceeded, a fluid and a fuel are mixed together, this mixture is fed through a line in a portion of which a catalytic element is arranged and subjected to catalytic combustion to generate the hot gases required for regeneration of the filter and regeneration of the filter is carried out by means of hot gases flowing through said filter and whose temperature is sufficiently high to provide combustion of the particles retained in the filter, wherein exhaust gases are circulated around an outside of the portion of the line in which the catalytic element is arranged to raise a temperature of the catalytic element and, prior to mixing the fluid and the fuel, the temperature of the fluid is raised up to the catalytic combustion light-off temperature.

2. A regeneration method as claimed in claim 1, characterized in that the temperature of the fluid is raised by heating said fluid by means of a heating resistor.

3. A regeneration method as claimed in claim 1, characterized in that air is used as the fluid.

4. A regeneration method as claimed in claim 1, characterized in that the exhaust gases of the engine are used as the fluid.

5. A regeneration method as claimed in claim 1, characterized in that an additive is added to the fuel to lower the combustion temperature of the particles.

6. An installation for filtering exhaust gases from an internal-combustion engine, notably of diesel type, comprising a filtration unit comprising at least one filtration zone including a filter cartridge through which the exhaust gases of the engine flow, a catalytic combustion device comprising a first line in a portion of which a catalytic element is arranged and through which a fluid and a fuel are fed to generate hot gases required for regeneration of at least one of said cartridges, an element for preheating the fluid flowing through the catalytic combustion device, and a second line through which exhaust gases flow, the second line being arranged so that exhaust gases flowing therethrough circulate around an outside of the portion of the first line in which the catalytic element is arranged to raise a temperature of the catalytic element.

7. A filtration installation as claimed in claim 6, characterized in that catalytic combustion device comprises a fuel injection device.

8. A filtration installation as claimed in claim 6, characterized in that the preheating element comprises a resistor.

9. A filtration installation as claimed in claim 6, characterized in that the catalytic combustion device comprises a means for pumping the fluid intended to flow through catalytic element.

10. A filtration installation as claimed in claim 6, characterized in that it comprises a distribution compartment arranged upstream from cartridge and carrying an inlet for the exhaust gases from the engine and an intake for the hot gases from catalytic combustion device.

11. A filtration installation as claimed in claim 10, characterized in that distribution compartment comprises a valve closing means for controlling the exhaust gas inflow from the engine and the hot gas intake.

12. A filtration installation as claimed in claim 6, characterized in that the catalytic element comprises a further catalytic element intended for oxidation of the exhaust gases.

13. A filtration installation as claimed in claim 6, characterized in that catalytic element is impregnated with a catalytic formulation allowing to reduce the nitrogen oxides (Nox) in the exhaust gases.

\* \* \* \* \*